United States Patent
Robinson

(10) Patent No.: US 9,240,988 B1
(45) Date of Patent: Jan. 19, 2016

(54) COMPUTER SYSTEM EMPLOYING DUAL-BAND AUTHENTICATION

(71) Applicant: EMC Corporation, Hopkinton, MA (US)

(72) Inventor: Peter Robinson, Enoggera Reservoir (AU)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 14/038,929

(22) Filed: Sep. 27, 2013

(51) Int. Cl.
*H04L 29/00* (2006.01)
*H04L 29/06* (2006.01)

(52) U.S. Cl.
CPC ........................................ *H04L 63/08* (2013.01)

(58) Field of Classification Search
CPC ................................. G06F 16/70; G06F 15/00
See application file for complete search history.

(56) References Cited

U.S. PATENT DOCUMENTS 5,828,893 A * 10/1998 Wied et al. .................... 709/229
7,546,276 B2 * 6/2009 Randle et al. .................. 705/65

* cited by examiner

*Primary Examiner* — Jeffrey Pwu
*Assistant Examiner* — Michael D Anderson
(74) *Attorney, Agent, or Firm* — Krishnendu Gupta; Jason A. Reyes

(57) ABSTRACT

A first machine (e.g., server VM) authenticates an untrusted second machine (e.g., new client VM) as a condition to performing or allowing a protected operation. Authentication information is written to a library using one mechanism, and then read from the library using another mechanism. One of the mechanisms is an untrusted mechanism employing the untrusted second machine, while the other is a trusted mechanism performed by the first machine either alone or in combination with a trusted management component that has privileged access to the library. If a written and read value match, it can be inferred that the second machine is authentic, because the trusted management component has accessed an existing library that is also separately accessed by the second machine.

18 Claims, 4 Drawing Sheets

COMPUTER SYSTEM EMPLOYING DUAL-BAND AUTHENTICATION

TECHNICAL FIELD

The invention is related to the field of authentication in computer systems.

BACKGROUND OF THE INVENTION

In the computer field it is known to employ authentication techniques to establish trust or confidence as a condition to allowing access to protected operations. One simple but well known authentication technique uses passwords that are handled confidentially and supposedly known to only a user and a computer system to which the user is to be authenticated. During authentication, the user presents the password, and the computer system checks the presented password against a password that is stored in association with an identifier of the user. If the values match, authentication has occurred and access to protected operation(s) is granted. Many other forms of authentication are known, usable in a variety of types of systems and operating circumstances.

One particular type of computer system employs so-called "virtualization" techniques in which physical host computer hardware executes instances of "virtual machines". A virtual machine is a software construct that presents a machine-like interface to a guest operating system and application program(s) executing in the context of the virtual machine, isolated from similar programs executing in the context of other virtual machines executing on the host computer hardware. One aspect of virtualization technology is the ability to very quickly and flexibly deploy new virtual machines as needed to accommodate changes in a system's workload. As an example, virtual machines can be used to deploy client type machines usable by a set of users in an organization. A new client machine is brought into service by instantiating a new client virtual machine on the existing host computer hardware. The new client virtual machine may be created as a clone of a standardized "template" client virtual machine defined in the system.

It should be appreciated that systems employing virtualization technology, especially those having a client-server structure and a continuously changing population of client virtual machines (VMs), may require an existing server VM to authenticate a new client VM before permitting the new client VM to fully join the system and receive services provided in the system. For example, it may be necessary that the server VM trust that the new client VM is located on the same virtual sub-network as the server VM before the client VM can gain access to services offered by the server VM. However, incoming connection requests which appear to be coming from the same virtual network may in fact be "spoofed" requests from inauthentic client VMs. The server VM may not be able to rely solely on the information contained in a connection request to arrive at a desired level of trust in a new client VM.

There is, therefore, a need for an authentication technique to deal with the above problem of "spoofed" requests from inauthentic client VMs.

SUMMARY OF THE INVENTION

There is disclosed a method by which a first machine authenticates an untrusted second machine as a condition to performing or allowing a protected operation for the second machine, comprising: performing a first operation relating to a library and including authentication information to be stored by the library, the first operation being performed using a write mechanism by which the library can be written to; performing a second operation relating to the library, the second operation being performed using a read mechanism by which the library can be read from, one of the read and write mechanisms being an untrusted mechanism employing the second machine, the other of the read and write mechanisms being a trusted mechanism employing the first machine alone or in combination with a trusted management component having privileged system-level access to the library; and performing or allowing the protected operation only upon successfully obtaining a copy of at least part of the authentication information in the second operation.

There is also disclosed a computer, comprising: instruction processing circuitry; memory; input/output circuitry; and one or more data buses interconnecting the instruction processing circuitry, memory and input/output circuitry together for data transfer therebetween; wherein the memory includes instructions executable by the instruction processing circuitry to cause the computer to function as a first machine performing a method of authenticating an untrusted second machine as a condition to performing or allowing a protected operation for the second machine, the method including: performing a first operation relating to a library and including authentication information to be stored by the library, the first operation being performed using a write mechanism by which the library can be written to; performing a second operation relating to the library, the second operation being performed using a read mechanism by which the library can be read from, one of the read and write mechanisms being an untrusted mechanism employing the second machine, the other of the read and write mechanisms being a trusted mechanism employing the first machine alone or in combination with a trusted management component having privileged system-level access to the library; and performing or allowing the protected operation only upon successfully obtaining a copy of at least part of the authentication information in the second operation.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Figure 1:
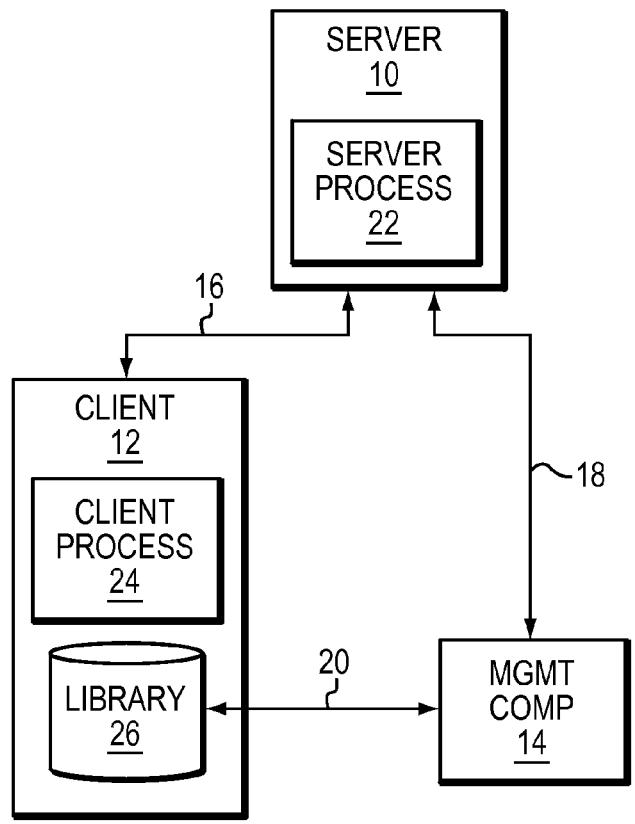
FIG. 1 is a block diagram of a computer system.

FIG. 1 shows a computing system including a server machine or server 10, client machine or client 12, and a management component (MGMT COMP) 14. These are interconnected by a client-server connection 16, a server-manager connection 18 and a manager-client connection 20 as shown. Some or all of the connections 16-20 may be realized as channels or paths through one or more data communications networks (not shown). The management component 14 may be realized by a management component application program executing on computer hardware, as generally known in the art. Specific examples of management component application programs are given below. In the system of FIG. 1, the management component 14 may utilize the same computer hardware as the server 10 or the client 12, or it may run on separate computer hardware (not shown). In one embodiment, described below, the server 10 and client 12 are realized as virtual machines running on physical host machine(s), and the management component 14 is a utility component in a virtual machine monitor or other privileged system software having a supervisory or control relationship with the client machine 12. For example, the management component 14 may be part of a privileged control virtual machine used for support and control of one or more client virtual machines executing on the same host physical machine (or collection of host physical machines). In this realization, the connections 16, 18 may be included in one or more virtual networks to which the server 10, client 12 and management component 14 are connected, as described in more detail below.

The server 10 is shown as including a server process 22, and the client 12 is shown as including a client process 24 and a library 26. The library is a component which can be shared/used by multiple computer programs. It is run continuously as a service with programs that wish to access the functionality of the library calling the library services. As the library is running continuously, it can keep information in memory rather than having to store information on disk. The server process 22 and client process 24 may be any of a variety of processes used for a particular application or system function. As but one example, the server process 22 may be a credential server process providing security credentials used for accessing services in a network, and the client process 24 may be an application program that needs to obtain such credentials from the server process 22 for use in obtaining such services.

In the present context, the server process 22 and client process 24 engage in an authentication procedure by which one or both of them "authenticates" the other, i.e., determines from certain information and/or behavior whether the other machine is actually what it purports to be. In one embodiment, for example, machines are identified within a network by an Internet Protocol (IP) address, and during authentication the client process 24 may present an IP address to the server process 22 as proof that the client machine 12 is a member of a given network and therefore entitled to obtain a credential for use within that network. The client-server exchange is conducted over the client-server connection 16. As described in more detail below, the server process 22 may then engage the client process 24 as well as the management component 14 in a process of confirming the authenticity of the client 12. In the parlance of computer security, the terms "trusted" and "untrusted" can be useful descriptors for the actors in such an authentication procedure. In the above example, the server 22 may deem the client 12 untrusted until successfully authenticated, whereas it deems the management component 14 as a trusted peer on which it relies during the authentication process.

In one embodiment, the server 10 is known to the management component 14 and is able to request execution of certain actions that may involve privileged operations with respect to the client machine 12. The communication between the server 10 and management component 14 is via the server-manager connection 18. In this context, "privileged" refers to the type of access enjoyed by a virtual machine monitor or hypervisor for example, although it is not limited to those particular forms. The management component has its own privileged interface (via client-manager connection 20) to the library 26 of the client 12. In particular, the management component 14 may directly read or modify the contents of the library 26, all of this entirely independent from the normal access to the library 26 seen by the client process 24 of the client 12.

Figure 2:
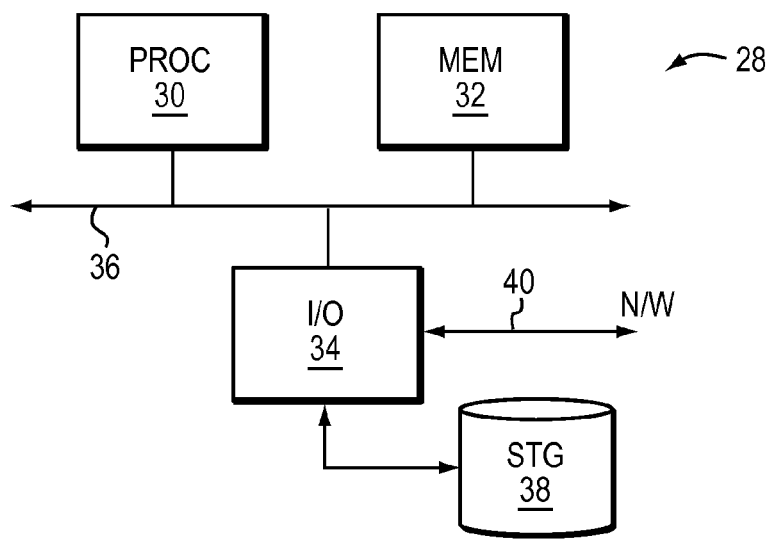
FIG. 2 is a block diagram of a computer.

FIG. 2 shows a computer 28 as including computer instruction processing circuitry (PROC) 30, memory 32, and input/output (I/O) circuitry 34 interconnected by one or more system data buses 36. The I/O circuitry 34 provides interfaces to external components such as storage 38 and a network (N/W) 40. FIG. 2 describes a physical computer or physical machine (PM) in which the various components consist of electronic circuitry such as integrated circuits, printed circuit boards, etc. In one example, the server 10 and client 12 of FIG. 1 may each be realized as a respective physical machine of this type. In other embodiments, one or more physical machines may be utilized to execute software to constitute a virtual computing environment, with one or more virtual machines (VMs) and virtual machine monitors (VMMs) or other supervisory software. In a virtual computing environment, it is useful to think of each virtual machine as having an organization according to FIG. 2, and in fact it is operated and managed that way. Those skilled in the art understand that a reference to a virtual machine or component thereof (e.g., its processor 30 or memory 32) refers to a managed or "virtualized" part or whole of an underlying physical machine resource or component, as made available to the virtual machine by the VMM or other system software.

Figure 3:
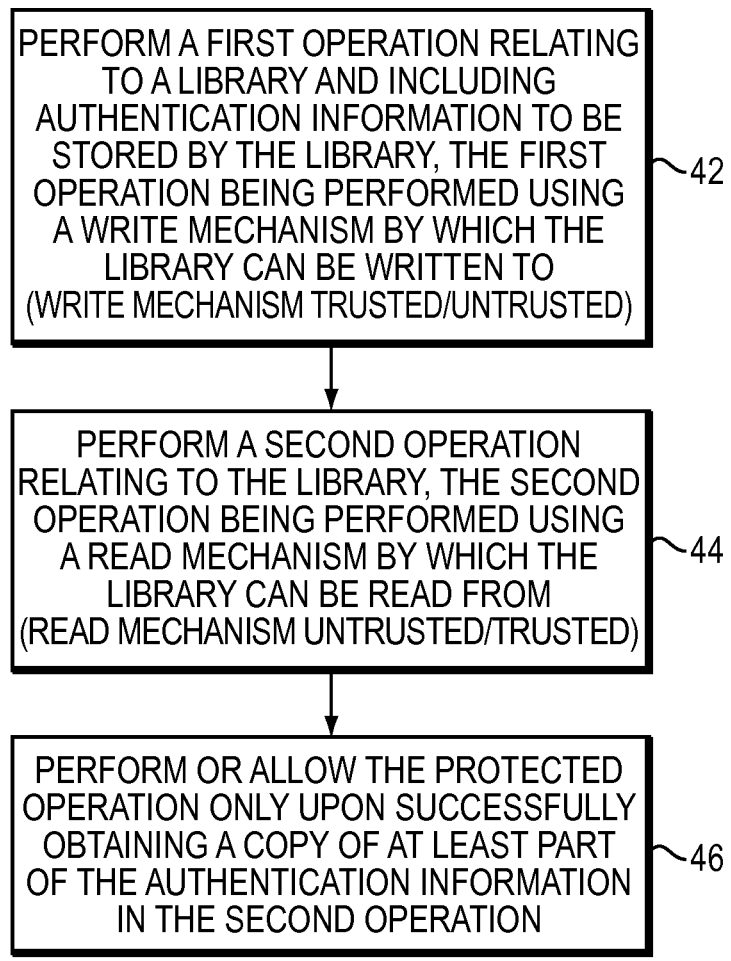
FIG. 3 is a flow diagram for an authentication procedure.

FIG. 3 illustrates an authentication process such as referred to above, described from the perspective of the authenticator (i.e., the component that needs to authenticate another (untrusted) component before allowing or performing some protected operation to be performed for the untrusted component). The process is first described using general language, then illustrated by one specific example of the type referred to above (the server 10 authenticating the client 12). As described further below, the process may be used in a variety of ways, including a case of a client 12 authenticating the server 10. Most generally, it is a process by which a first machine authenticates an untrusted second machine as a condition to allowing or performing a protected operation for the second machine. The machines may be physical machines or virtual machines. The protected operation may be almost any operation to which some type of access control is applied. For example, it may be access to a private database, or generating a security credential for use by a client as mentioned above.

At 42, the first machine performs a first operation that relates to a library and includes authentication information to be stored by the library. The first operation is performed using a write mechanism by which the library can be written to. The term "write mechanism" is explained below. The authentication information consists of a name and a value. For example, the authentication information can be in a name/value format where the name is an identifier that facilitates identification of the value. It is preferable that the identifier name is a long pseudorandom number generated by the first machine such that an attacker will find it difficult to guess the identifier name and hence gain illegitimate access to the value. It is be understood from the foregoing that the identifier name should have sufficient entropy so as to not be easily guessable by an intruder or other person not permitted access to the protected operation.

At 42 the indication (trusted/untrusted) refers to two possible aspects of the first operation. Reference can be made to two cases, a first case in which the write mechanism is trusted and a second in which it is not. "Trusted" in this context means that only trusted components, communications and other mechanisms involved in the write operation are all explicitly or implicitly trusted by the first computer, whereas "untrusted" means that at least part of the write operation includes at least one element that is not trusted, namely the untrusted second computer. Additional description of each case is provided below.

At 44, the first machine performs a second operation that relates to the library. The second operation is performed using a read mechanism (also explained below) by which the library can be read from. This step has the indication "untrusted/trusted", signifying that in the above-discussed two cases the read mechanism is untrusted in the first case (when the write mechanism is trusted) and trusted in the second case (when the write mechanism is untrusted). The same definition of trust applies. Specific examples illustrating the various cases are given below. In any case, the first machine is looking for an expected result that can generally only be obtained when the second machine is in fact authentic, because receiving the expected result indicates that the second machine has a library known to and under the control of the trusted management component. The nature and results of unsuccessful outcomes are described below.

At 46, the first machine performs or allows the protected operation only upon successfully obtaining a copy of at least part of the authentication information in the second operation (which has been returned from the library that was written to in the first operation 42).

It will be appreciated that the procedure of FIG. 3 is based on using a trusted mechanism to test whether an untrusted second machine (involved in the untrusted mechanism) is in fact trustworthy. Generally "mechanism" refers to some combination of local library accesses and communication exchanges over one or more of connections 16, 18 (specific examples given below). In one case this testing is achieved by writing to the library using a trusted mechanism, then obtaining the correct result when reading the library using the untrusted mechanism. In the other case it is vice-versa—the write is done via the untrusted mechanism, and the read is done via the trusted mechanism. In this case the trusted mechanism reliably returns either part of the authentication information (i.e., value) or an indication that no such library exists. If the second machine is authentic, the library will exist and will have had the correct authentication information written to it before the read access so that the correct value is returned in response to the read.

It will be further appreciated that the procedure of FIG. 3 can be used in a variety of ways and in different types of systems, including for example client-server systems and both physical and virtualized systems. In client-server systems, the procedure can be used by either the client or the server to authenticate the other. The procedure has ready application to virtualized systems by using the inherent control of a virtual machine monitor (VMM) or other system software over guest VMs that it manages. A VMM or similar control software is always present and enjoys privileged access to the library of the guest VMs it manages, and thus a trusted management component can be deployed in a VMM or other management infrastructure and used in carrying out the disclosed procedure.

As an illustrative example, the first and second machines of FIG. 3 may be the server 10 and client 12 respectively of FIG. 1. In this case, the library is the library 26 of the client 12, to which the management component 14 has privileged access as discussed above. In this example, it is assumed that the client 12 and server 10 are engaged in a communication exchange over connection 16 as part of the authentication process, and that the server 10 can use the connection 18 to send requests for privileged library operations to the management component 14. It is further assumed that the client (e.g., client process 24) has a normal, read/write access to the library 26 that is used in the authentication process. It is further assumed that the client 12 has initially provided an IP address or other value to the server 10 indicating that the client 12 is a legitimate member of the computing environment. For example, a network address appears as one that is or could have been actually configured in the network, based on IP prefix or other indicia for example. The server 10 then uses the process to confirm, using dynamic data and operations, that this is indeed the case.

In such an environment, the first operation at step 42 may be a command or request from the server 10 to the client 12 that the client 12 write the authentication information accompanying the command/request to the library. An authentic client 10 performs this library write. Operation in the case of an inauthentic client is discussed below.

The second operation at step 44 may be a request from the server 10 to the management component 14 to read at least part of the authentication information of the same library. In this case, the request may identify the specific client machine 12 with which the server 10 believes it is communicating as well as the library and part of the authentication information (i.e., the identifier name part). For example, the request may include the IP address that the untrusted client machine 12 initially provided, as mentioned above. In response to this request, the management component 14 accesses the library 26 and then returns the value part of the authentication information that corresponds to the name part (assuming it is found—error conditions described below). Then at 46, the server 10 compares the value returned by the management component 14 with the value that it is using for the authentication and that was sent to the client 12 for writing in the library. If these match, this is a successful authentication and the server 10 performs or allows the protected operation. Otherwise, authentication is not successful, and appropriate steps are taken (which will normally include not performing or allowing the protected operation, or doing so in a way that is more limited than in the case of successful authentication).

In the case of an inauthentic client 12, one of several conditions will usually be met that will prevent the above procedure from succeeding. In one case, the client identifier presented by the client 12 does not identify any client machine actually known to or under the control of the management component 14. For example, the proffered identifier may be a guess or a copy of an identifier from some other machine or system. In this case, the management component 14 returns an error indication to the server 10 indicating that either the client or library does not exist. The server 10 interprets this response as indicating that the client 12 is inauthentic.

Another scenario is that the identifier from the inauthentic client 12 actually identifies a separate authentic client under control of the management component 14, in which case the management component 14 attempts to access the library and its contents. In this case, however, either the library will not exist or it will not have the correct authentication information, because the inauthentic client does not have access to the library of the authentic client 12 that it is pretending to be. Thus, the management component 14 will either return an error condition or a response with an erroneous value. In general, an unsuccessful result in the process of FIG. 3 will have one of these types of conditions, i.e., either no response, a response with an error indication (e.g., no such machine or library) or a response with an erroneous value.

Advantageously, the above implementation does not require the client VM to have permission to access the authentication information associated with the library and only requires the management component 14 to have a low level of privilege to the client VM. This differs to at least one previous approach in which authentication information was written to a file in a file system of a client VM. Such an approach required the client VM's operating system to have permission to read/write to the file as well as the management component having high level privilege to the client VM.

FIGS. 4-7 illustrate four specific cases of the general process of FIG. 3. In each Figure, the untrusted machine is indicated as such by shading. Thus FIGS. 4 and 5 describe authentication of the client 12 by the server 10, and FIGS. 6 and 7 describe authentication of the server 10 by the client 12. The dark lines indicate the paths of the first and second operations, which are shown as "WR" for the write operation of step 42 and RD for the read operation of step 44.

Figure 4:
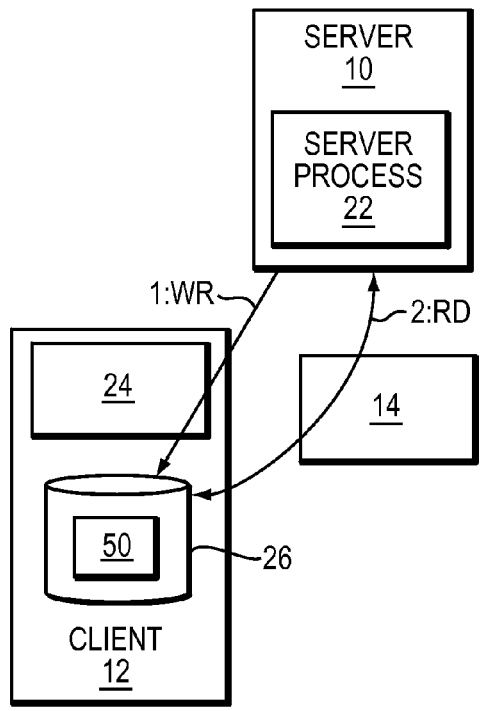
FIGS. 4 through 7 are schematic diagrams depicting different variations of an authentication procedure.

FIG. 4 illustrates the above-discussed example in which the server 10 effects a write to the library 50 via the client process 24 and reads part of the authentication information (i.e., value) via the management component 14. This process may be referred to as IB-OB, where IB means "in-band" and OB means "out-of-band" Here "in-band" refers to use of the client-server connection 16, and "out-of-band" refers to use of a separate connection or channel, such as server-manager connection 18. "IB-OB" means that the process first uses the in-band connection 16 to perform the write, then the out-of-band connection 18 to perform the read.

Figure 5:
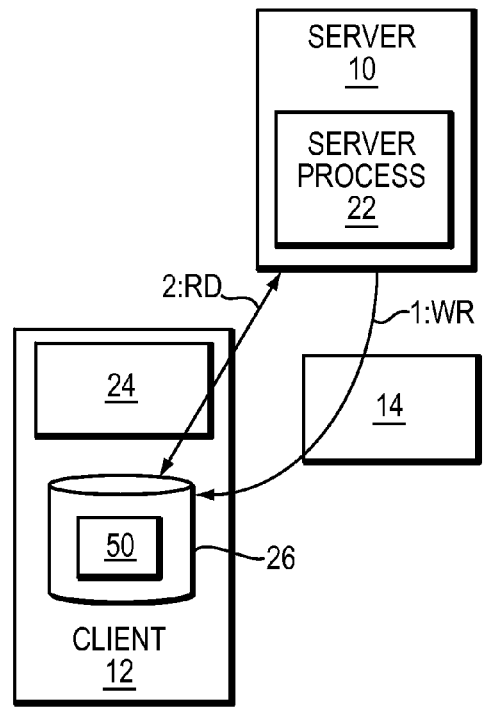

FIG. 5 illustrates a process similar to that of FIG. 4, except that it is now OB-IB. That is, the write is first effected using the out-of-band connection 18 and management component 14, then the read is performed using the client process 24 and in-band connection 16. In this case, the authentic client 12 performs a normal read operation from the library 50 as identified in the read request from the server 10 and returns (step 44 of FIG. 3).

Figure 6:
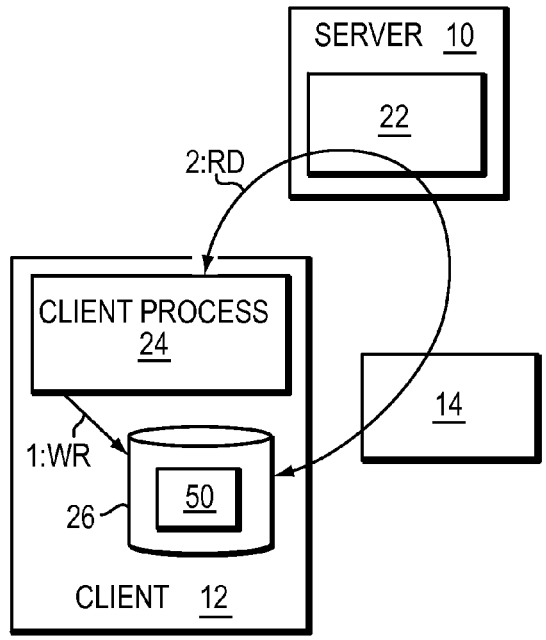
Figure 7:
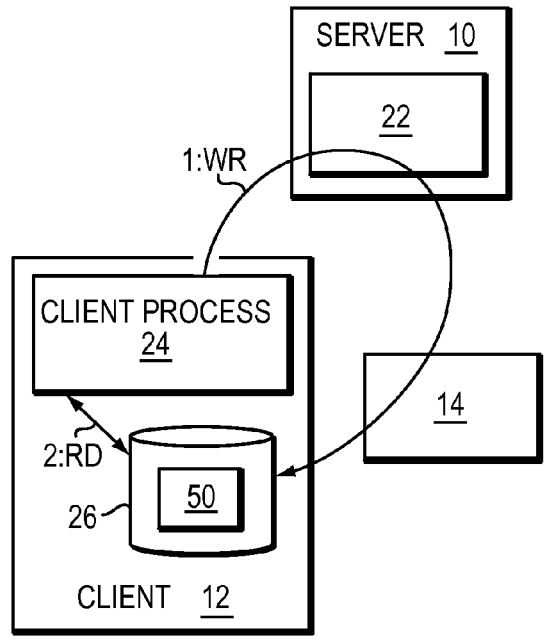

FIGS. 6 and 7 illustrate cases in which the client 12 is authenticating the server 10. In these cases it is the client 12 that is to perform or allow the protected operation at the request of the server 10. In this case, the protected operation may be providing sensitive information or access to resources of the client machine 12 or its computing environment. The client 12 assumes local integrity, i.e., it trusts the associated management component 14 having access to its library 26. The process will succeed or fail depending on whether the untrusted server 10 is actually known to and trusted by the management component 14.

In FIG. 6, the write operation of step 42 (FIG. 3) is performed locally within the client 10, and the read operation of step 44 is performed across both connections 16 and 18. The client process 24 sends a read request to the server process 22, which then sends a corresponding read request to the management component 14. In the case of an authentic server 10, the management component 14 accesses the library 50 and returns part of the authentication information (i.e., value), and these are forwarded to the client 12 by the server 10. They will of course match. Unsuccessful outcomes are described below.

FIG. 7 shows the process being performed in the opposite direction, i.e., the client process 24 first performs the write operation of step 42 across both connections 16 and 18 and involving the untrusted server 10, then performs a local read operation to read part of the authentication information. If the correct authentication information (i.e., value) is found, it indicates that the write was successful and inferred that the server 10 is authentic.

The unsuccessful outcomes in the processes of FIGS. 6 and 7 may be similar to those for FIGS. 4 and 5, although for slightly different reasons. The client 12 interacts only with the untrusted server 10. In FIG. 6, the server 10 may return no response or a response with the incorrect value. It is assumed in this case that the inauthentic server 10 is unknown to the management component 14 and would be unable to invoke any privileged operations such as described above. If the inauthentic server 10 returns a response in the process of FIG. 6, for example, presumably such a response is one created by the inauthentic server 10 in an attempt to fool or "spoof" the client 12.

While the above descriptions in connection with FIGS. 3-7 are from the perspective of the authenticator, those skilled in the art will appreciate that they inherently include implicit descriptions from the perspective of the machine being authenticated as well.

Figure 8:
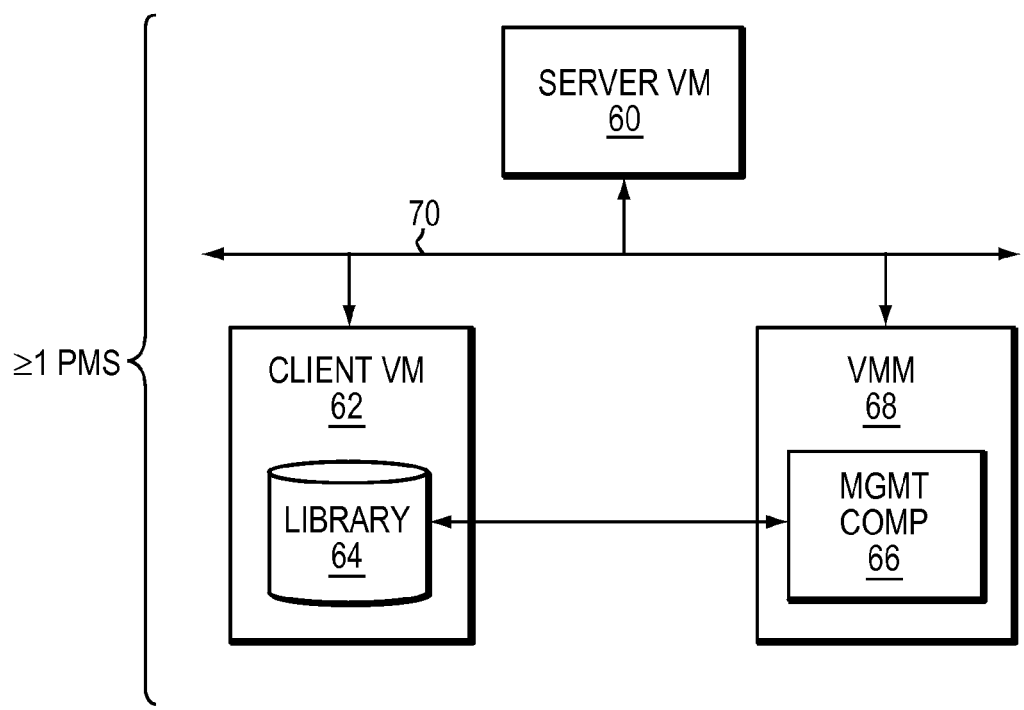
FIG. 8 is a block diagram of a virtual computing environment.

FIG. 8 shows an example of a virtual computing environment of the type mentioned above. It includes a server VM 60 and client VM 62 (including library 64), along with a management component 66 that is part of or works in conjunction with a virtual machine monitor VMM 68. These components are all connected to a virtual network 70. As indicated at left, this collection of components may be realized using one or more physical machines (PMs) (e.g., computer(s) 28 of FIG. 2). It will be appreciated that the processes of FIGS. 3-7 map directly to the configuration of FIG. 8. One particular aspect of virtual computing environments is the ability to rapidly deploy new machines (in the form of VMs instantiated on PMs having spare computing capacity) as needed to accommodate changes in computing workload. This is often done using a so-called "cloning" process, in which a new VM is initially created as an almost identical copy of an existing VM. The new VM is then "personalized" or customized as necessary, typically including an assignment of an individualized network address in the virtual network 70. This virtual NW address may be used to identify the client VM 62 to the server VM 60 when initiating the authentication process, as mentioned above.

While various embodiments of the invention have been particularly shown and described, it will be understood by those skilled in the art that various changes in form and details may be made therein without departing from the scope of the invention as defined by the appended claims.

One type of realization of a computer system as illustrated in FIG. 8 can employ known commercial virtualization software, including for example software known by the name VMWare®. In a VMWare system, the client 24 may include a VMware Tools Library™. The management component 14 may include one or both of a pair of utilities known as VShield™ and VCenter™. VShield provides security functionality to the VMs such as a firewall and antivirus (AV) functions. VCenter is a privileged management console for a system of interconnected ("clustered") VMWare hosts. It should be appreciated that in at least one particular implementation the server VM 60 will have an account or be otherwise registered in the management infrastructure of the system, and one or more management components will provide an application programming interface (API) by which the server VM 60 will communicate with the management component to obtain library accesses as described herein. The trust relationship between the server VM 60 and management component 14 will have been pre-established by a separate process, which could include administrative action for example.

Referring back to FIG. 3, the in-band connection 16 may be realized in a variety of ways, and preferably includes security features. In one case, electronic mail may be employed. In other cases, a custom application-layer messaging protocol may be used over a secure network connection such as a TLS connection.

Although in the above description it is assumed that the authenticator creates the authentication information used in the process, in alternative embodiment at least part of it may be created by another component, including the untrusted component being authenticated.

What is claimed is:

1. A method by which a first machine authenticates an untrusted second machine as a condition to performing or allowing a protected operation for the second machine, comprising:

by the first machine, performing a write operation relating to a library of one of the first machine and the second machine and including an authentication identifier to be stored by the library;

subsequently by the first machine, performing a read operation relating to the library and returning a read value, wherein the read operation using either an untrusted mechanism employing the second machine or a trusted mechanism employing the first machine alone or in combination with a trusted management component having privileged system-level access to the library, wherein the write operation using the trusted mechanism if and only if the read operation uses the untrusted mechanism, or the write operation using the untrusted mechanism if and only if the read operation uses the trusted mechanism; and by the first machine, performing or allowing the protected operation for the second machine only upon the read value returned by the read operation matching the authentication identifier, wherein the first and second machines are virtual machines executing on one or more physical host machines, and wherein the management component is included in a set of virtual machine management components having a pre-established trust relationship with one of the virtual machines.

2. A method according to claim 1, wherein:
the second machine has access to the library;
the trusted mechanism includes a first communication path by which the first machine requests that the management component exercise privileged system-level access to the library; and
the untrusted mechanism includes a second communication path by which the first machine requests that the second machine exercise access to the library.

3. A method according to 2, wherein:
the trusted mechanism is the write mechanism; and
the untrusted mechanism is the read mechanism.

4. A method according to 2, wherein:
the trusted mechanism is the read mechanism; and
the untrusted mechanism is the write mechanism.

5. A method according to claim 2, wherein the first machine is a service providing machine having an account by which the first machine is known to the management component.

6. A method according to claim 1, wherein:
the first machine has access to the library;
the trusted mechanism includes a local library operation on the library by the first machine; and
the untrusted mechanism includes first and second communication paths, the first communication path used by the first machine to send a library operation request to the second machine, the second communication path used by the second machine to send a request to the management component to exercise the privileged system-level access to the library.

7. A method according to 6, wherein:
the trusted mechanism is the write mechanism; and
the untrusted mechanism is the read mechanism.

8. A method according to 6, wherein:
the trusted mechanism is the read mechanism; and
the untrusted mechanism is the write mechanism.

9. A method according to claim 1, wherein one of the first and second machines is a client machine, and the other of the first and second machines is a server machine.

10. A method according to claim 1, wherein the first and second machines are virtual machines executing on one or more physical host machines, and wherein the management component is included in a set of virtual machine management components having a pre-established trust relationship with one of the virtual machines.

11. A method according to claim 10, wherein the first machine is server virtual machine, and the second machine is a client virtual machine.

12. A method according to claim 10, wherein an unsuccessful response in the second operation includes an indication that a virtual machine identified in the second operation does not exist.

13. A computer, comprising:
instruction processing circuitry;
memory;
input/output circuitry; and
one or more data buses interconnecting the instruction processing circuitry, memory and input/output circuitry together for data transfer therebetween;
wherein the memory includes instructions executable by the instruction processing circuitry to cause the computer to function as a first machine performing a method of authenticating an untrusted second machine as a condition to performing or allowing a protected operation for the second machine, the method including:
performing a write operation relating to a library of one of the first machine and the second machine and including an authentication identifier to be stored by the library;
performing a read operation relating to the library and returning a read value, wherein the read operation using either an untrusted mechanism employing the second machine or a trusted mechanism employing the first machine alone or in combination with a trusted management component having privileged system-level access to the library, wherein the write operation using the trusted mechanism if and only if the read operation uses the untrusted mechanism, or the write operation using the untrusted mechanism if and only if the read operation uses the trusted mechanism; and
performing or allowing the protected operation for the second machine only upon the read value returned by the read operation matching the authentication identifier, wherein the computer being one of one or more physical host machines hosting the first and second machines as virtual machines, and wherein the management component is included in a set of virtual machine management components having a pre-established trust relationship with one of the virtual machines.

14. A computer according to claim 13, wherein:
the second machine has access to the library;
the trusted mechanism includes a first communication path by which the first machine requests that the management component exercise privileged system-level access to the library; and the untrusted mechanism includes a second communication path by which the first machine requests that the second machine exercise access to the library.

15. A computer according to claim 14, wherein the first machine is a service providing machine having an account by which the first machine is known to the management component.

16. A computer according to claim 13, wherein:

the first machine has access to the library;

the trusted mechanism includes a local library operation on the library by the first machine; and the untrusted mechanism includes first and second communication paths, the first communication path used by the first machine to send a library operation request to the second machine, the second communication path used by the second machine to send a request to the management component to exercise the privileged system-level access to the library.

17. A computer according to claim 13, being one of one or more physical host machines hosting the first and second machines as virtual machines, wherein the management component is included in a set of virtual machine management components having a pre-established trust relationship with one of the virtual machines.

18. A computer according to claim 17, wherein the first machine is server virtual machine, and the second machine is a client virtual machine.

* * * * *